P. J. LYBACK.
DITCHING MACHINE.
APPLICATION FILED AUG. 26, 1909.
1,038,915.
Patented Sept. 17, 1912.
7 SHEETS—SHEET 5.
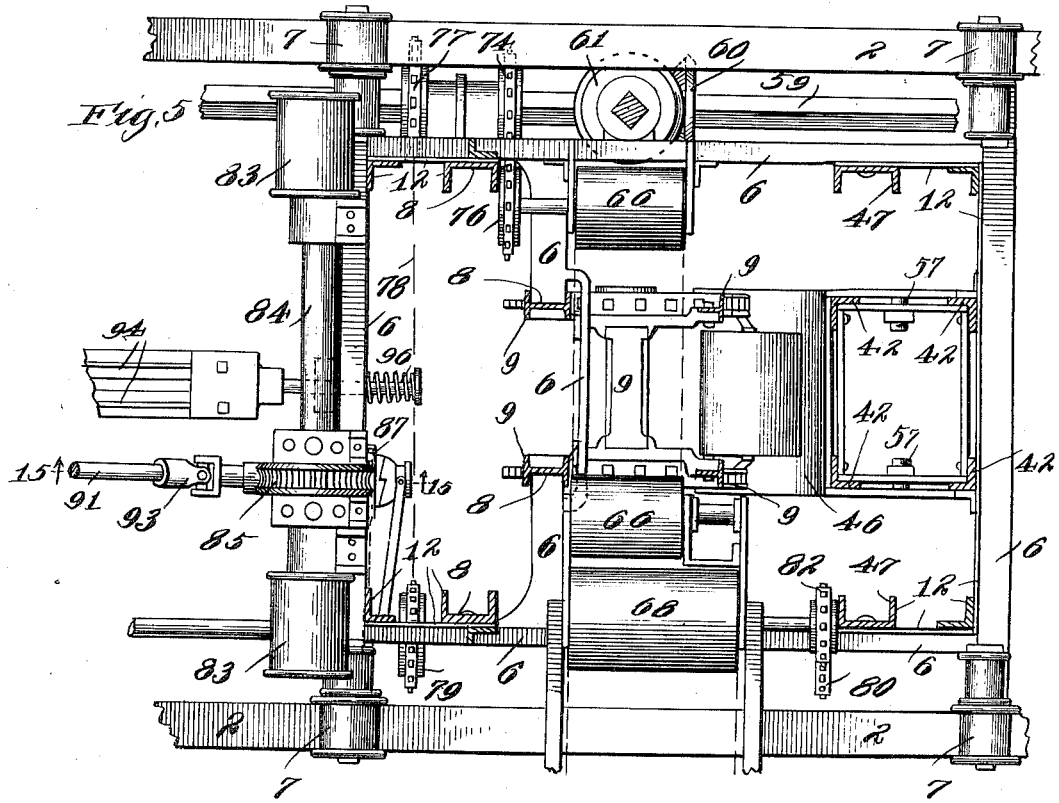
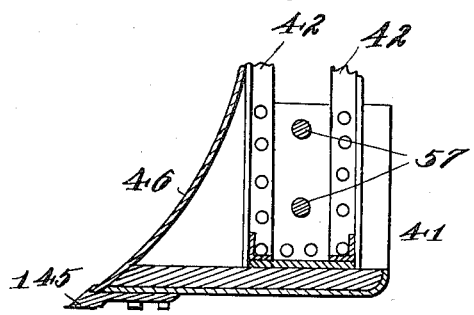
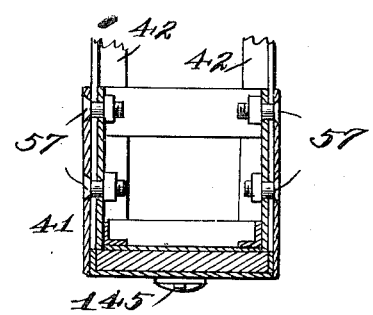
Witnesses.
Inventor.
Peter J. Lyback
By Cyrus W. Rice Atty

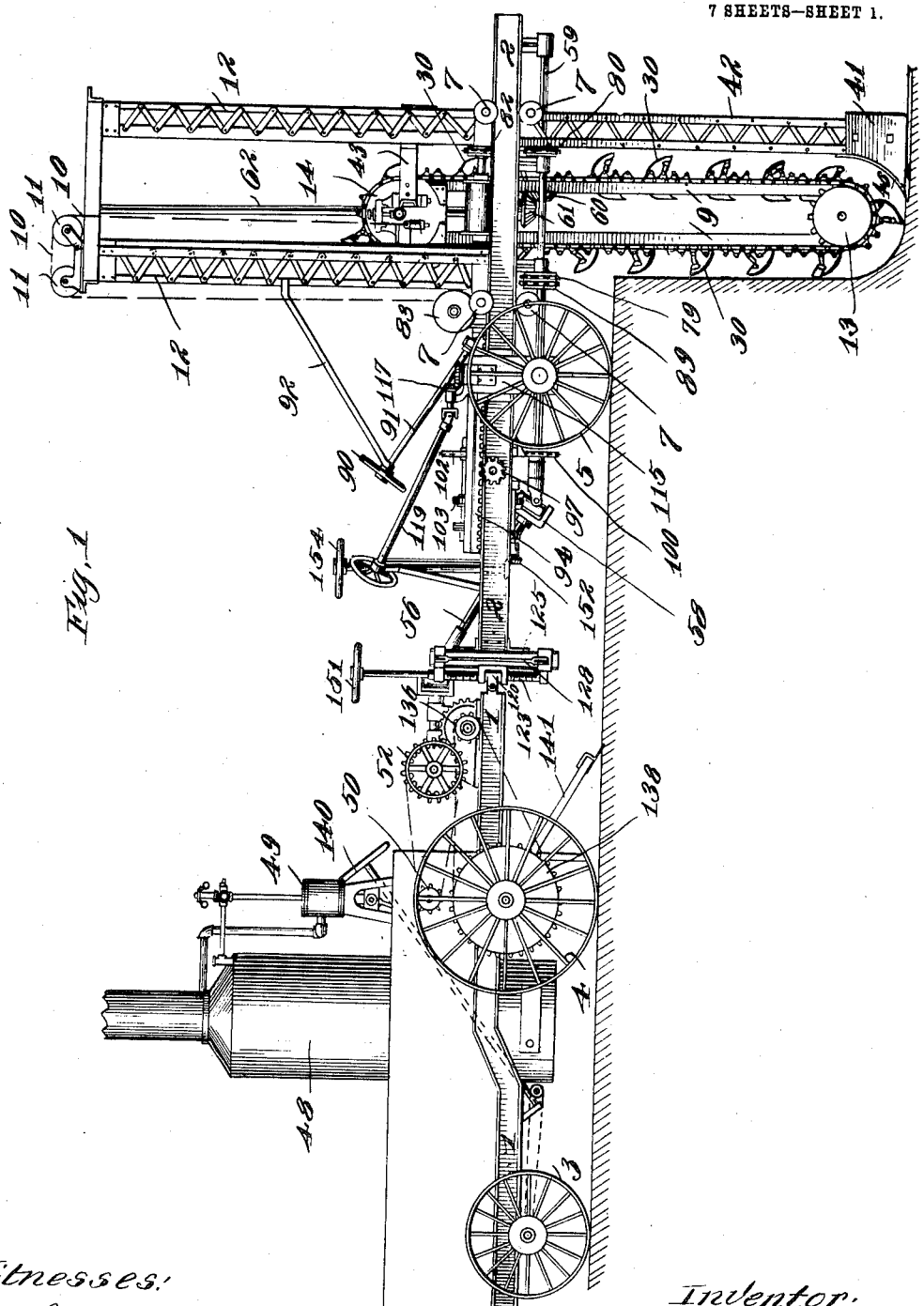

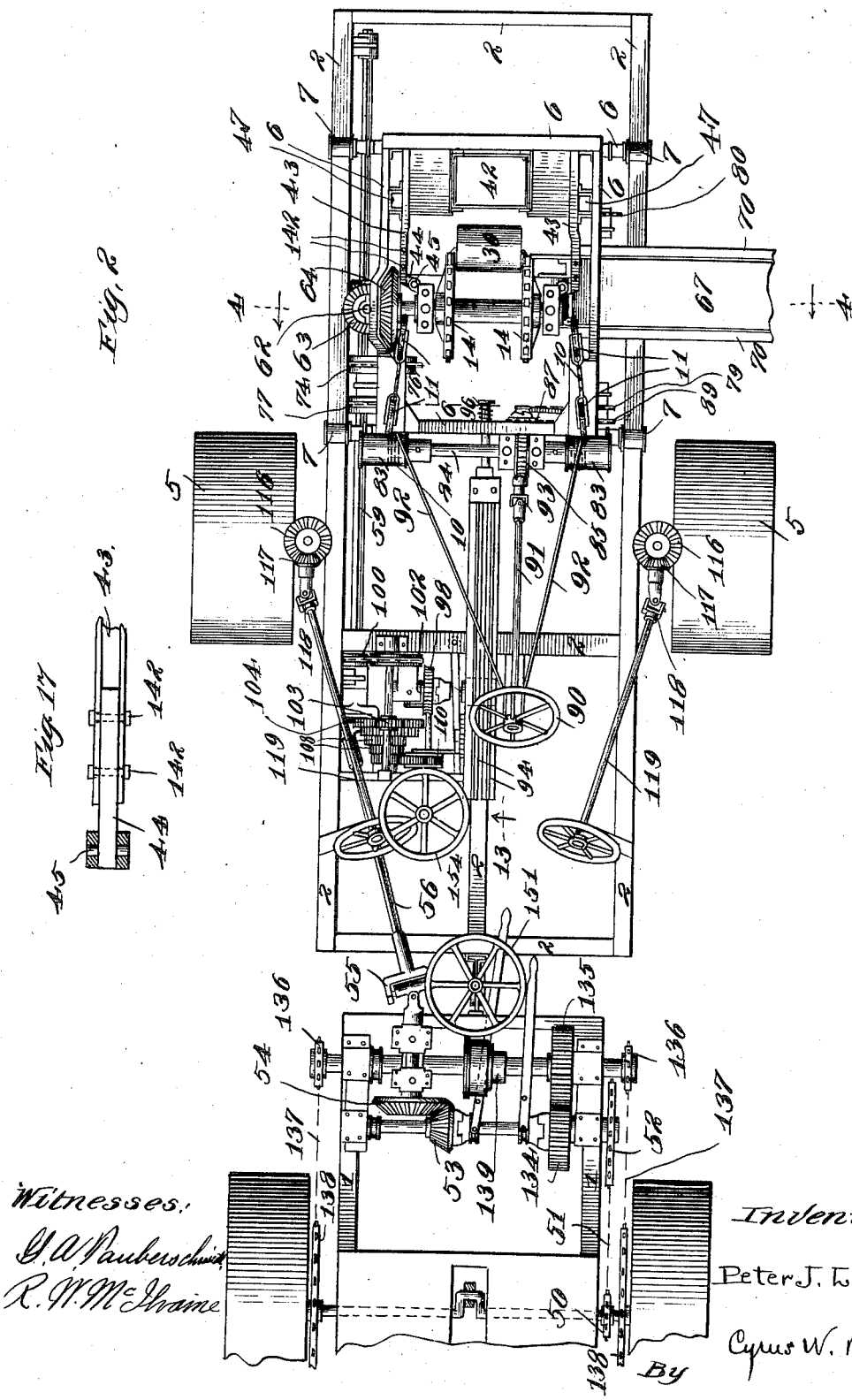
P. J. LYBACK.
DITCHING MACHINE.
APPLICATION FILED AUG. 26, 1909.
1,038,915.
Patented Sept. 17, 1912.
7 SHEETS—SHEET 2.

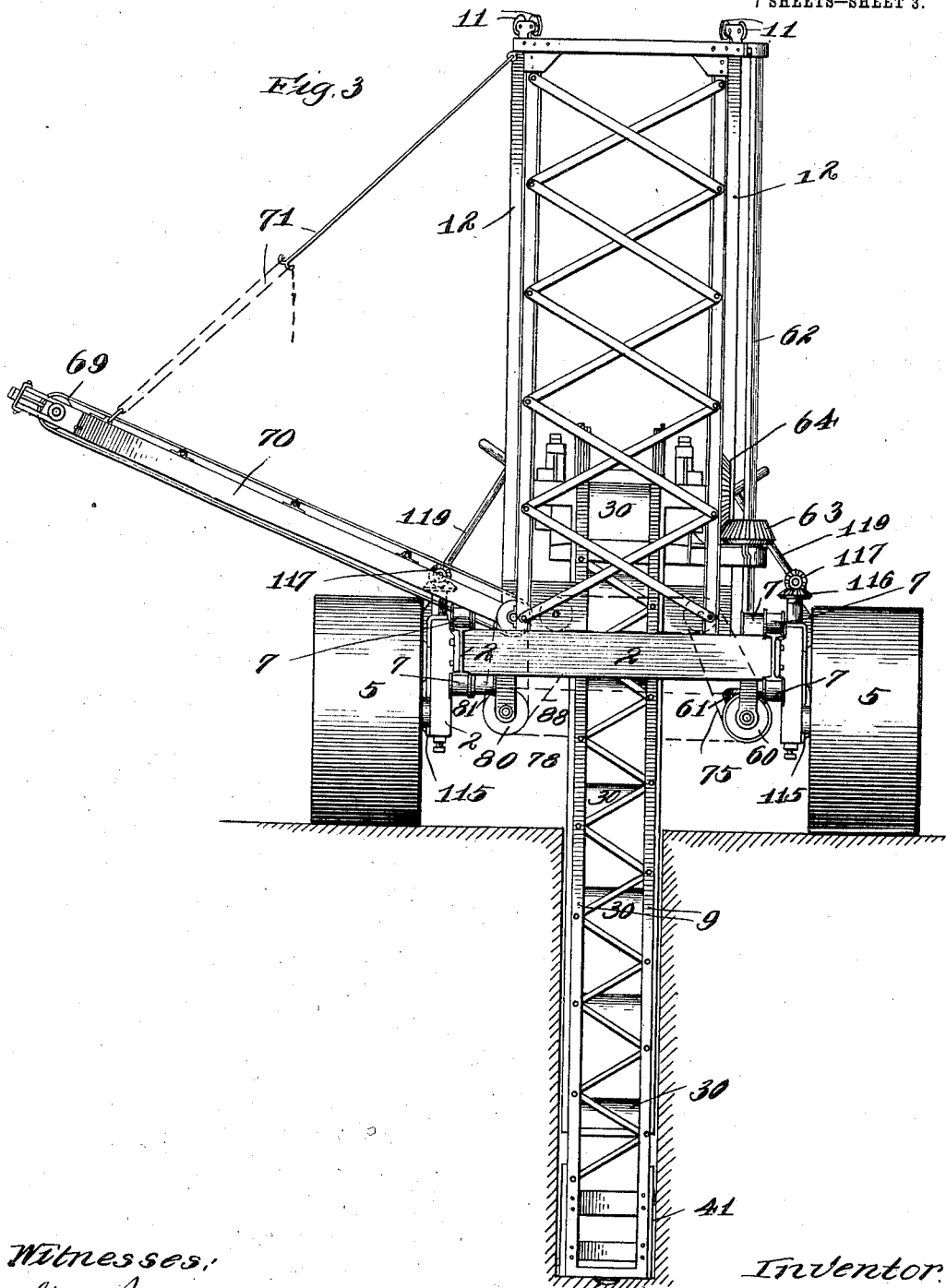

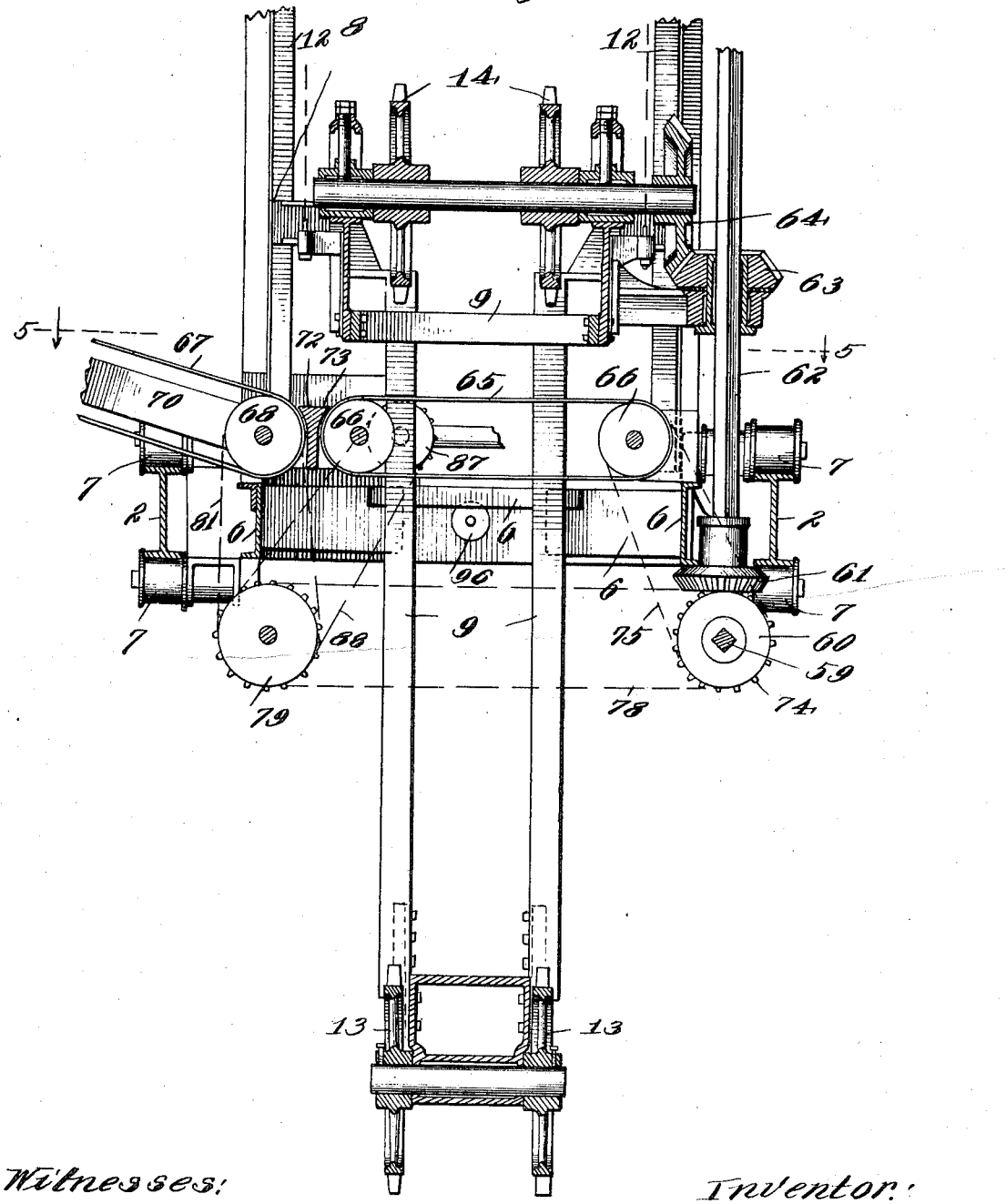

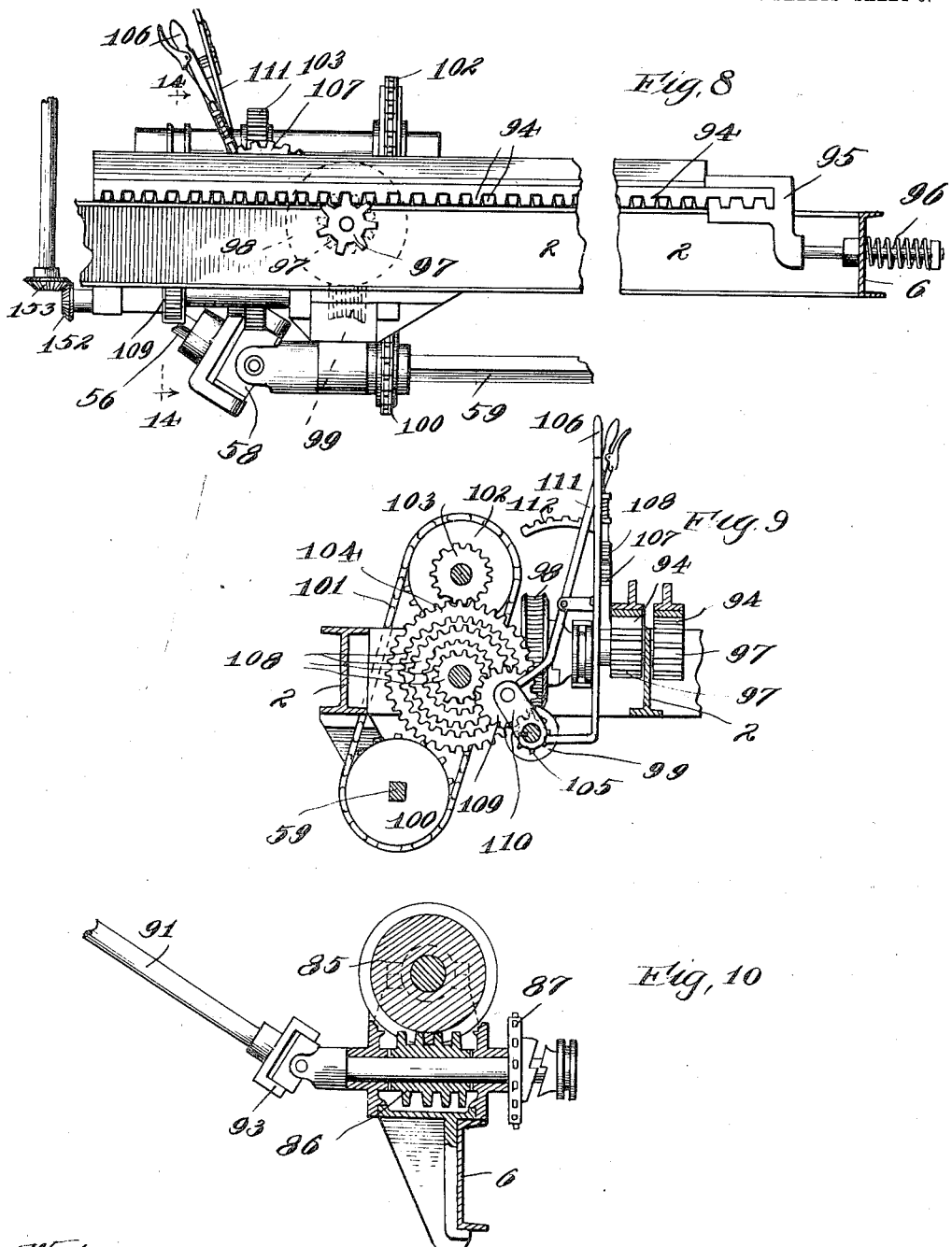

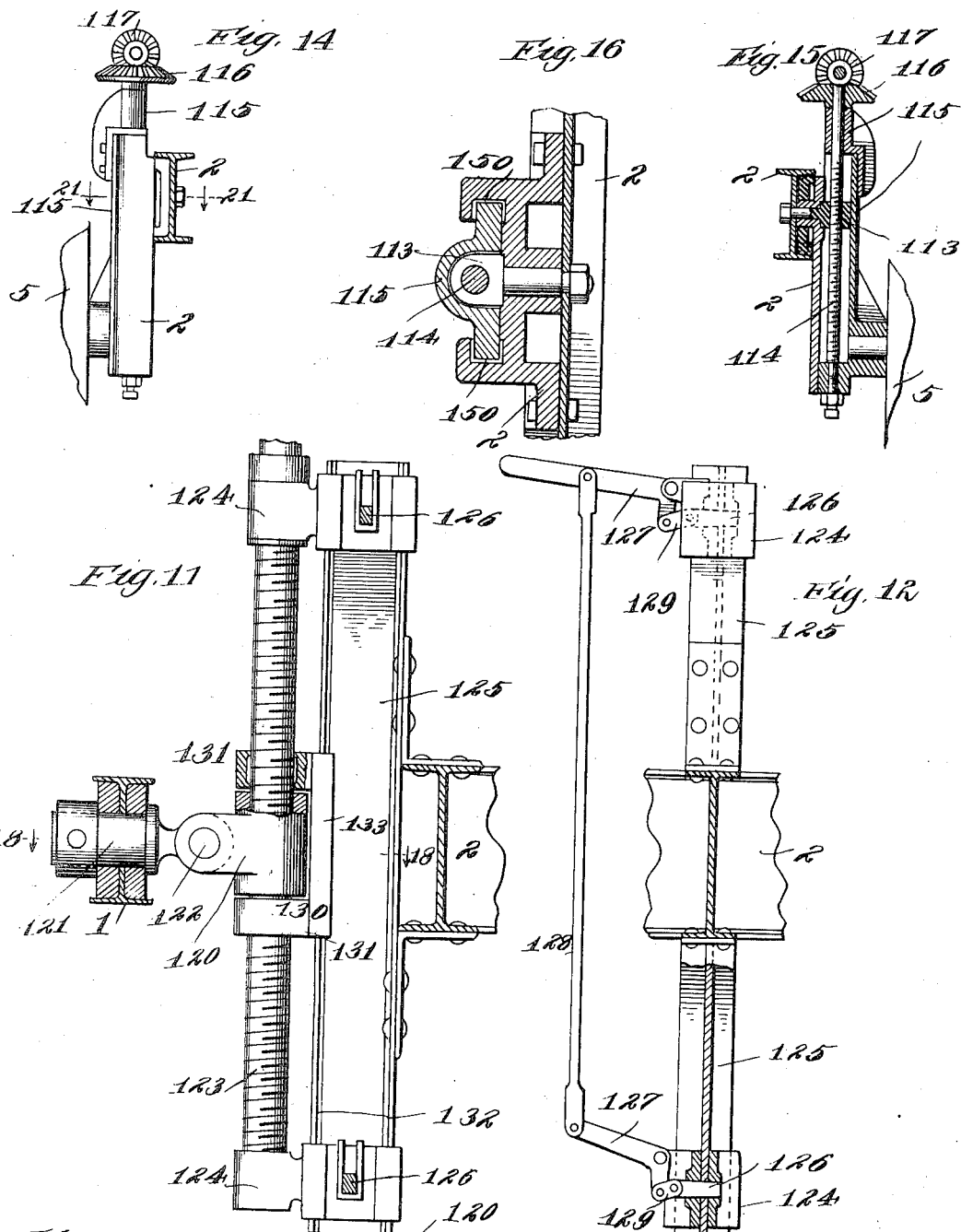

UNITED STATES PATENT OFFICE.

PETER J. LYBACK, OF CHICAGO, ILLINOIS.

DITCHING-MACHINE.

1,038,915.  Specification of Letters Patent. Patented Sept. 17, 1912.

Application filed August 26, 1909. Serial No. 514,753.

*To all whom it may concern:*

Be it known that I, PETER J. LYBACK, a citizen of the United States, and a resident of the city of Chicago, in the county of Cook and State of Illinois, have invented certain new and useful Improvements in Ditching-Machines, of which the following is a specification.

My invention relates to ditching machines and its object is to provide a machine of that character by which the earth will be removed by excavators operating in a vertical direction and suitably "fed" forward horizontally along a main supporting frame.

My invention has other objects also which will appear hereinafter.

These objects are attained by, and my invention is embodied in, the following described mechanism illustrated by the accompanying drawings, in which:—

Figure 1 is a left side elevation of my ditching machine, some of its smaller parts being omitted; Fig. 2 is a plan view thereof, with the forward part broken away; Fig. 3 is a rear elevation of the same; Fig. 4 is a vertical transverse section of parts of my machine on line 4—4 of Fig. 2; Fig. 5 is a horizontal section of the same on line 5—5 of Fig. 4; Fig. 6 is a vertical longitudinal section of the supporting foot; Fig. 7 is a vertical transverse section of the same; Fig. 8 is a longitudinal vertical section of parts of my machine on line 13—13 of Fig. 2; Fig. 9 is a vertical transverse section of certain parts on line 14—14 of Fig. 8; Fig. 10 is a vertical section of certain parts taken longitudinally of my machine on line 15—15 of Fig. 5; Fig. 11 is a left side elevation of the connection between the two vehicle bodies of my machine; Fig. 12 is a rear elevation of the same; Fig. 13 is a horizontal section of the same on line 18—18 of Fig. 11; Fig. 14 is a rear elevation of the device by which the left side of the rear vehicle body of my machine may be raised and lowered to "level" the same transversely; Fig. 15 is a vertical central section of the like device for raising and lowering the right side of said vehicle body; Fig. 16 is an enlarged horizontal section of the same on line 21—21 of Fig. 14; and Fig. 17 is a detail view of the connections between the vertically moving carriage and the post carrying the supporting foot.

The main frame of my ditching machine is preferably formed in two connected vehicle bodies 1 and 2, the forward of which, 1, travels on suitable vehicle wheels 3 and traction wheels 4, and carries the power, steering gear, etc., while the rear vehicle body 2 travels on two vehicle wheels 5 and carries the excavating means, feed means and their controlling parts. A traveler 6 moves horizontally as on the flanged rollers 7 along the rear vehicle body 2 in its longitudinal direction, being drawn forward by the feeding means. In suitable slide bearings 8 a carriage 9 bearing the excavating means moves vertically on the traveler 6 being supported by the chains 10 (indicated by dotted lines, as are all the chains in the drawings excepting the excavator chain belts) which pass over the pulleys 11 journaled on the upwardly extend-posts 12 of the traveler 6. Journaled on this carriage 9 at its lower end are the sprocket wheels 13 and at its upper end the driving sprocket wheels 14 carrying a pair of chain belts to which are attached suitable excavating buckets 30. A foot 41 adapted to slide on the bottom of the ditch assists to support the carriage 9, to the upper part of which its upwardly extending post 42 is rigidly fastened, the forwardly extending bars 43 of the post 42 being bolted at 142 to lever arms 44 hinged at 45 on the carriage 9, so that the bolts 142 may be removed, the lever arms turned inwardly, and the post 42 detached. The forward face 46 of the foot is concaved to conform to the path of the buckets in turning over the wheel 13, and is positioned immediately behind them, so as to scrape up and confine the loose earth in the bottom of the ditch that the same may be taken up by the buckets. The post 42 in its vertical movement slides in suitable guides 47 on the traveler 6, and may be detached from the foot by removing the bolts 57. On its bottom and at its center laterally, the foot is provided with a groover 145, segmental in cross section, which serves to mark a groove in the bottom of the ditch in which round drain tile may be laid and thus prevented from rolling out of line. Groovers of different sizes adapted to different sized tile, and attachable to and detachable from the foot, may be employed.

Power is transmitted in the following manner from a suitable source, as the boiler 48 and engine 49 carried by the forward vehicle body 1: The sprocket wheel 50 on the engine's crank shaft turns by its chain 51 the sprocket wheel 52 whose shaft carries the bevel gear 53 meshing with the bevel gear 54, whose shaft by a Hooke's joint 55 rotates the shaft 56 splined to its fork of the Hooke's joint in order to accommodate the machine to travel on curves, etc. The shaft 56 by a second Hooke's joint 58 turns the horizontal squared shaft 59 journaled on the rear vehicle body 2. This shaft 59 rotates its bevel gear 60 adapted to travel along it with the movement of the traveler 6 on which its bearing is bracketed. Meshing with the gear 60, the bevel gear 61 rotates its squared vertical shaft 62 journaled on the traveler 6 and having the bevel gear 63 adapted to travel along it with the movement of the carriage 9 on which its bearing is bracketed. Meshing with the gear 63, the bevel gear 64 on the shaft carrying the driving sprocket wheels 14, rotates them and drives the chain belt on which are carried the buckets and thus effects the excavating process. When the buckets turn in passing over the upper sprocket wheels 14, the excavated earth falls therefrom on a primary belt conveyer 65 carried on rolls 66; this belt delivers the earth to a secondary belt conveyer 67 carried by the roll 68 and the roll 69 which is journaled on the outward end of an arm 70 pivoted on the traveler 6 concentric with the roll 68, and supported at its outward end at a convenient angle, as by the chain and bar 71 attached to the upper end of the traveler; the excavated earth is thus discharged at a distance to one side of the machine. In passing from the primary to the secondary conveyer, the earth is slid over a small connecting platform 72 whose edge 73 is adapted to scrape and clean the earth from the primary belt. These conveyers are operated as follows: Rotated by and adapted to move along the squared shaft 59, the sprocket wheel 74 whose bearing is bracketed on the traveler rotates by its chain 75 the sprocket wheel 76 on the shaft of the roll 66 and thus drives the primary conveyer. The sprocket wheel 77 (operating and driven in the same manner as the wheel 74) rotates by its chain 78 the sprocket wheel 79, on whose shaft is the sprocket wheel 80 which by its chain 81 rotates the sprocket wheel 82 on the shaft of the roll 68, and thus the secondary conveyer is driven.

The carriage 9 with the parts carried thereby including the foot 41 and its post 42, are raised and lowered by the following mechanism: The supporting chains 10 passing over the pulleys 11 are wound on the drums 83 carried by a shaft 84 journaled on the traveler and having a worm gear 85 whose worm 86 is rotated by the power transmitted to its sprocket wheel 87 by means of the chain 88 driven by the sprocket wheel 89 on the same shaft with the sprocket wheel 79 which is driven as hereinbefore explained. The worm 86 may be turned by hand by rotating by the hand-wheel 90, its shaft 91 braced at 92, and connected to the worm shaft by a Hooke's joint 93.

As the excavating progresses, the traveler 6 is gradually fed forward by the power through the following mechanism: A rack 94, preferably double with alternating teeth as shown, is attached to the forward end of the traveler 6 by a connecting piece 95 provided with a spring buffer 96 to relieve the jar and sudden strain. The rack is drawn forward to effect the feeding by its engaging gear 97 whose shaft carries the driving worm gear 98 which is rotated by its worm 99 by the following mechanism: The horizontal squared shaft 59 rotated by the power as hereinbefore explained, drives by its sprocket wheel 100 and chain 101 the sprocket wheel 102, the gear 103 on whose shaft meshes with one of the gears 104 of a change speed gearing, having other gears 108 of graduated diameters on the same shaft as shown. On the shaft of the worm 99 is splined its driving gear 105 adapted to be moved along its shaft to change the speed, as by the engaging hand lever 106 provided with a toothed sector 107 and pawl 108. Meshing with the gear 105 and adapted to mesh with any of the gears 104, 108, of the change speed gearing, the intermediate gear 109 is journaled on the link 110 which is pivoted on the worm's shaft: a hand lever 111 fulcrumed on the lever 106 and provided with the toothed sector 112 and adapted to throw the link 110, serves to engage the gear 109 with any of the gears of the change speed gearing to transmit power therefrom to the gear 105 and thus effect the feeding. The worm 99 may also be rotated by the hand wheel 154 whose shaft carries the bevel gear 153 meshing with the bevel gear 152 on the worm's shaft.

The rear vehicle body 2 may be leveled transversely by the following device: In a heavy supporting nut 113 rigidly secured to the rear vehicle body, turns a vertical screw shaft 114 journaled on the axle-carrying member 115 of each of the vehicle wheels 5: this screw shaft is provided with a bevel gear 116 for turning, with which meshes the bevel gear 117, whose shaft is connected by a Hooke's joint 118 with the hand wheel shaft 119, by turning which the vehicle body 2 may be raised and lowered on the axle-carrying member 115, which is adapted to move vertically in the slides 150 on said body.

The connection between the forward and the rear vehicle bodies, by which the machine is adapted to turn to right or left and by which the rear body may be leveled longitudinally, is as follows: A heavy nut 120 is connected to the rear of the forward vehicle body 1 by a swivel 121 and a pivot 122 having a transverse horizontal axis: the screw shaft 123 threaded in this nut and having a hand wheel 151 is journaled on the brackets 124 which slidably embrace a vertical beam 125 on the forward end of the rear vehicle body 2. This beam and the brackets are pierced to receive tapering keys 126 which serve to hold the brackets tightly in position: suitable levers 127 connected by the rod 128, fulcrumed on the brackets and connected to the keys by short links 129, operate to tightly press the keys into place and to withdraw them. A reinforcing member 130 having integral nuts 131 positioned above and below the nut 120 and threaded for the screw 123, is adapted to slide vertically on the beam 125, whose forward T 132 is embraced by the flanges 133 of the reinforcing member. The screw shaft 123 is thus protected from being bent or sprung. There should be sufficient space between the nut 120 and each of the nuts 131, as shown, to allow the machine to turn to the right or left without causing these nuts to impinge.

The entire machine may be moved from place to place by its own power by means of the following devices: The sprocket wheel 52 driven as hereinbefore explained, carries on its shaft the gear 134 meshing with the gear 135 whose shaft carries the sprocket wheels 136 which by their chains 137 drive the sprocket wheels 138 on the hubs of the traction wheels 4. A differential gear box 139 incloses a differential gear of common form to accommodate the machine to travel on curves. In traveling about the machine may be steered as by the hand-wheel 140 operating in any well-known manner to turn the axle of the front wheels 3. A suitable prop or anchor 141, pivoted on the machine, extending backward, and adapted to engage the ground, serves to resist the thrust of the feeding operation.

Suitable clutches, with operating levers, etc., are shown on the drawings, whose construction and operation sufficiently appear.

My ditching machine is operated in the following manner: The carriage 9 with the foot 41 and connected parts being raised to their highest position, by winding the chains 10 on their drums 83, the machine is in condition to be moved by its power. To begin an excavation, the lever arms 44 are detached (by removing their bolts 142) from the bars 43, the foot 41 and its post 42 being held in their highest position by any suitable means as by thrusting a bar of wood through the truss lacings of the post 42 and the rear posts 12 of the traveler. The foot 41 is then detached from the post 42 by removing its bolts 57. The carriage 9 is then allowed to slowly descend, the buckets 30 by their sharp outer edges, excavating a pit in the earth to the desired depth of the ditch: during this operation the feeding is suspended. When the desired depth is attained, the anchor 141 being adjusted, and the feeding means actuated, the traveler is slowly "fed" forward and the ditch is excavated. When this cutting has continued a sufficient distance, the carriage 9 is again raised, the foot 41 connected to its post 42 and the post again attached to the carriage, after which the carriage and foot being lowered to the bottom of the ditch, the feeding and excavating is continued until the traveler has been drawn by the feeding means to its extreme forward position or nearly so, when the operation must cease until the machine is moved forward on its wheels (the traveler and excavators remaining stationary and the foot on the bottom of the ditch) to reposition the machine for cutting the next section of the ditch. While so moving the machine to thus reposition it, the keys 126 should be withdrawn, that the brackets 124 may freely slide on the beam 125.

Certain improvements in chain belts and earth excavators carried thereby, originally shown and claimed in this application, are divided and canceled from this application as required, and are made the subject matter of my divisional or separate application, Serial Number 550,735, filed March 21, 1910.

It is manifest that my invention may be embodied in other and varying mechanisms and I do not propose to confine myself to the details of construction shown and described, further than as set forth in the claims.

I claim:

1. In a machine of the character described, a main frame, a traveler movable horizontally thereon to effect the feeding, a carriage movable vertically on the traveler and having vertically operating excavators, a driven horizontal shaft journaled on the frame and having a splined wheel journaled on the traveler, and means actuated by the rotation of the splined wheel to raise and lower the carriage.

2. In a machine of the character described, a main frame, a traveler movable horizontally thereon to effect the feeding and provided with vertically operating excavators and a conveyer adapted to convey the excavated earth from the excavators, a driven horizontal shaft journaled on the frame and having a splined wheel journaled on the traveler, and means actuated by the rotation of the splined wheel to drive the conveyer.

3. In a machine of the character described, having two vehicle bodies one of which carries excavators and has two vehicle wheels normally coaxial, a leveling device comprising a vertical screw shaft journaled on one body, whose nut is carried by the other body, and a reinforcing member threaded on the screw adjacent said nut and vertically slidable on the body on which the screw shaft is journaled.

4. In a machine of the character described, having two vehicle bodies one of which carries excavators and has two vehicle wheels normally coaxial, a leveling device comprising a vertical screw shaft, journaled in brackets movable vertically in slides on one body, whose nut is carried by the other body, and means for immovably clamping the brackets on their slides.

5. In a machine of the character described having two vehicle bodies and a vertical screw shaft, journaled in brackets movable vertically in slides on one body, and whose nut is carried by the other body, a device for immovably clamping the brackets on their slides comprising tapering keys adapted to tightly engage in orifices in the brackets and slides, and levers fulcrumed on the brackets and operating to insert and withdraw the keys.

6. In a machine of the character described, a device for leveling the main frame transversely on its vehicle wheels, comprising a screw shaft, journaled on the axle-carrying member of the vehicle wheel and whose nut is carried by the main frame, a flexible shaft journaled on the main frame, and means adapted to turn the screw shaft by the rotation of the flexible shaft.

7. In a machine of the character described, two connected vehicle bodies, both remaining stationary during the operation of the machine, one of said bodies carrying an operating power, the other having a traveler movable horizontally thereon and carrying excavators, automatically acting means for moving the traveler on its vehicle body to effect the feeding, flexible power transmitting connections between the vehicle bodies to drive the excavators and to effect the feeding by the power, and a leveling device intermediate the vehicle bodies to level the excavator-bearing vehicle body longitudinally by the other vehicle body.

8. In a machine of the character described, a main frame, a traveler movable horizontally thereon to effect the feeding, vertically operating excavators carried by the traveler, a driven horizontal shaft journaled on the frame and having a splined wheel journaled on the traveler, means actuated by the rotation of the splined wheel to operate the excavators, and means actuated by the horizontal shaft to move the traveler to effect the feeding.

9. A machine of the character described comprising vehicle bodies tractionally connected pivotally, the one carrying an operating power, the other having a traveler movable horizontally thereon to effect the feeding, a carriage movable vertically on the traveler and having an excavator-bearing chain belt with its driving wheel, a driven horizontal shaft journaled on the excavator's vehicle and having a splined gear journaled on the traveler, a vertical shaft journaled on the traveler having a gear meshing with the horizontal shaft's gear and a splined gear journaled on the carriage and adapted to rotate the belt driving wheel, and flexible power-transmitting connections between the vehicle bodies to drive the excavators and to effect the feeding.

In witness whereof, I have signed my name to this specification in the presence of two subscribing witnesses.

PETER J. LYBACK.

Witnesses:
VICTOR C. WINNER,
C. C. DENT.

---

Copies of this patent may be obtained for five cents each, by addressing the "Commissioner of Patents, Washington, D. C."